June 16, 1936.  P. G. EDWARDS ET AL  2,044,424

INSULATION TESTING SYSTEM

Filed July 13, 1932

INVENTORS
P. G. Edwards and C. E. Clutts
BY
ATTORNEY

Patented June 16, 1936

2,044,424

UNITED STATES PATENT OFFICE 2,044,424

INSULATION TESTING SYSTEM

Paul G. Edwards, Millburn, and Charles E. Clutts, Clifton, N. J., assignors to American Telephone and Telegraph Company, a corporation of New York Application July 13, 1932, Serial No. 622,346

20 Claims. (Cl. 175—183)

This invention relates generally to electrical testing and measuring systems. More particularly, this invention relates to systems for the measurement and determination of the insulation characteristics of telephone circuits or lines or the like.

Present maintenance routine of the telephone plant requires a regular insulation resistance measurement of each of the many conductors of a telephone cable. Under certain conditions, as in wet weather, these measurements are made more frequently. Consequently, there is urgent need for testing and measuring apparatus which will permit quick and accurate measurements to be made of the amount of insulation resistance of each of a plurality of conductors or circuits.

There is now available equipment suitable for making these tests of insulation resistance but much time is required and the results are not highly accurate.

In accordance with the present invention, arrangements will be described which are suitable for making an instantaneous test of the insulation resistance on one or more circuits. These arrangements will employ a gas-filled trigger tube which may contain neon, argon or other inert gases and which will hereinafter be referred to as a gas-filled tube. One of the general principles of operation of the apparatus is that a telephone line, or its equivalent for certain purposes, a condenser, when charged, will drain a certain percentage of its charge through an associated resistance in an interval of time which will be proportional, within limits, to the magnitude of the resistance. The gas-filled tube may be set up so as to indicate when a predetermined amount of current has become discharged therethrough.

Figure 1:
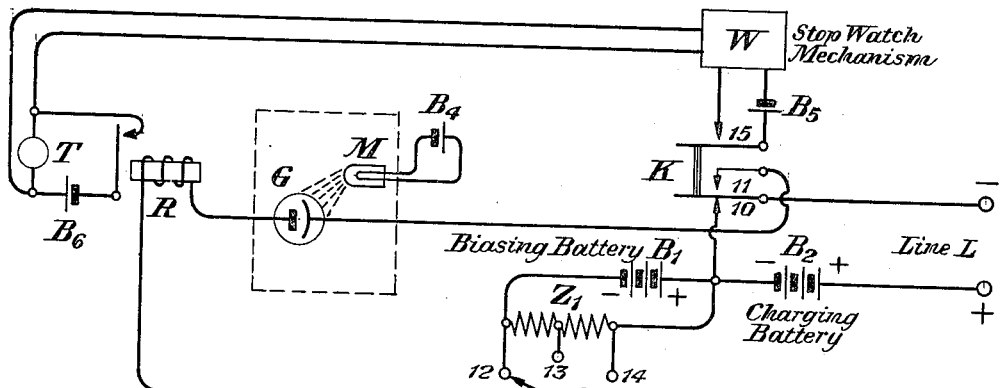
Figure 2:
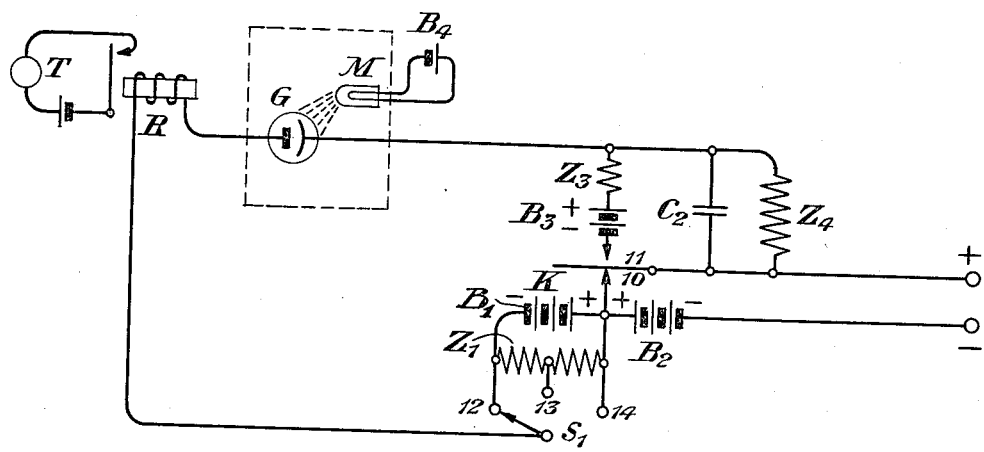
Figure 3:
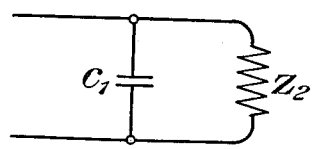
Figure 4:
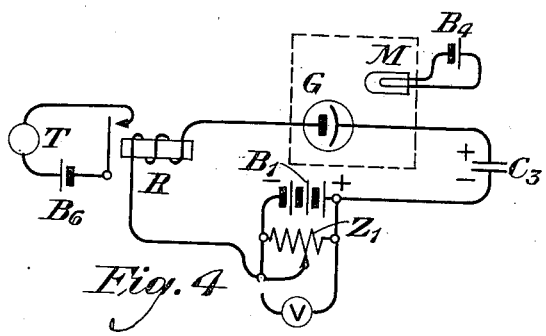

This invention will be better understood from the detailed description hereinafter following when read in connection with the accompanying drawing in which Figures 1 and 2 schematically represent circuits suitable to carry out the principles of this invention. Fig. 3 will represent the equivalent of a telephone line. Fig. 4 represents an arrangement for measuring voltages of elements such as condensers.

Referring to Fig. 1 of the drawing, the reference character G represents a gas-filled tube which may be connected in series with a circuit including the winding of a relay R, a switch $S_1$, a biasing battery $B_1$, a charging battery $B_2$, a line L and a test pick or key K having two armatures, one of which may move between contacts 10 and 11 and the other may alternately close a contact 15. The series circuit to the tube G is closed only when the first mentioned armature of the key K closes contact 11. The biasing battery $B_1$ is bridged by a resistance $Z_1$ which is tapped at three points designated 12, 13 and 14, each of which may be contacted by the switch $S_1$ so as to provide a predetermined proportion of this biasing voltage. Of course, the resistance $Z_1$ may be set up as a potentiometer having a movable arm continuously adjustable throughout its entire range of resistance. The terminal voltage of the biasing battery $B_1$ is less than the breakdown voltage of the tube G.

The equivalent of the telephone line L is shown in Fig. 3 and is composed of a condenser $C_1$ and a resistance $Z_2$, both connected in parallel relationship. The quality of a line is primarily determined by the magnitude of the resistance $Z_2$. This resistance is of nearly infinite magnitude or of a magnitude above some high and predetermined value for a very good line and of a substantially lower value for a poorer line.

When the contact 10 of key K of the arrangement shown in Fig. 1 is closed, the line L will be connected with the charging battery $B_2$. The line L, or its equivalent condensive element $C_1$ shunted by resistance $Z_2$ shown in Fig. 3, will be quickly charged to a voltage substantially equal to that of the charging battery $B_2$. The upper side of the line L will be at a negative polarity and the lower side at a positive polarity and the gas-filled tube G and relay R will, of course, be disconnected from the circuit of the charging battery $B_2$.

Subsequently, when the contact 11 of key K is closed, the tube G and the relay R will be connected in series with the line L and batteries $B_1$ and $B_2$, and if switch $S_1$ closes contact 12, and if the line L is a good one, the total voltage in the circuit in series with the tube G will be merely the voltage produced by the biasing battery $B_1$. This is so because at the instant that the key K closes contact 11, the voltage to which the line L has been charged will be equal in magnitude and opposite in polarity to the voltage of the charging battery $B_2$, and these voltages will just balance and neutralize each other. However, as time elapses, the line L will discharge some of its voltage because of its inherent leakage resistance. Then the total voltage in the circuit in series with the tube G will gradually increase until the breakdown potential of the tube G is reached. As the gap of the tube is broken down, the line L will quickly discharge any remaining voltage through the circuit of the tube and the relay R will promptly operate. This relay should be of sufficient resistance, or external resistance added in series with its winding, so that at breakdown the charge on the line will not be dissipated too rapidly and thereby interfere with satisfactory operation of the relay R. A visual or audible indicating device or apparatus such as that designated T which may, for example, be a lamp or a sounder, may be connected in a circuit controlled by the armature of the relay R and this circuit will be operated upon the closure of the contact associated with the armature of the relay R.

Assuming a given value for the effective potential of the biasing battery B₁, then the time required for the line L to discharge sufficiently so as to cause the gap of the tube G to break down will be proportional to the leakage resistance of line L. This time interval will be large if the leakage resistance is high and correspondingly smaller if the leakage resistance is low.

A stop watch mechanism W of any well-known type is arranged to start as key K closes contacts 11 and 15. The closing of contact 15 completes the circuit of battery B₅ to the stop watch mechanism W, which then operates. The stop watch mechanism is arranged to stop promptly upon the breakdown of the gap of the tube G. The relay R operates upon the breakdown of the gap, as already stated, and the armature of this relay will be connected in series with a battery B₆ in a circuit leading to the stop watch mechanism W, and this mechanism will then be stopped. The stop watch mechanism W will be reset in its initial starting position when contact 15 of the key K opens, thus opening the circuit of battery B₅.

Inasmuch as the breakdown voltage of some gas-filled tubes varies with the amount of light falling on their electrodes, it may be necessary to provide a source of illumination, such as a small Mazda lamp M, near the tube G. Battery B₄ would supply current for the lamp M. This is to supply light of predetermined luminosity to the tube in the event that it is enclosed in a box or used in a poorly lighted room. However, the breakdown voltage of the tube is substantially constant over a fairly wide range of illumination.

If it is desired to make tests on a plurality of circuits from a point remote from the testing apparatus, as, for example, a terminal strip, a main distributing frame, etc., a test pick of special construction and described in our copending application, Serial No. 669,438, filed May 4, 1933, has been designed for use with the apparatus of this invention. This test pick incorporates all of the functions of the key K described herein above. The armature of the relay R may, if desired, be connected to an indicating device such as a single stroke bell (not shown), which will be sounded upon the operation of the relay R. The count of seconds begins after the application of the test pick to charge any circuit or line under test and after the connection of that circuit or line in series with the batteries B₁ and B₂, the tube G and the winding of relay R. The elapsed time before the bell sounds due to the operation of the relay R may be estimated by the maintenance operator. The insulation resistance of a circuit can easily be determined from the elapsed time inasmuch as the two are directly proportional. If he so desires, the maintenance operator may set up his apparatus so as to determine whether the insulation resistance of the circuit is above or below a certain predetermined value. These features will be described in greater detail in connection with Fig. 2.

The resistance $Z_1$ which shunts the biasing battery $B_1$ is divided so as to present three different measuring scales, each determined by one of the contacts 12, 13 or 14. When contact 12 is closed, each second after contact 11 becomes closed and before the relay R operates may represent 10 megohms of leakage or insulation resistance and, similarly, if contact 13 or contact 14 is closed, each second may represent 1 megohm, or 0.1 megohm, respectively.

The voltage across the line L at any instant may be determined from the expression:

$$E_e^{-\frac{t}{ZC}} \qquad (1)$$

where E is the charging voltage, $e$ the Naperian base, $t$ the elapsed time, Z the insulation resistance of the line and C the capacitance of the line. Similarly, the magnitude of the voltage discharge by the line at any instant will be represented by the following equation:

$$E_t = E\left(1 - e^{-\frac{t}{ZC}}\right) \qquad (2)$$

The expressions (1) and (2) are well known.

In Equation (2), $E_t$, E, $e$ and C are constant. Thus, in order to maintain a balanced equation, the expression $$1 - e^{-\frac{t}{ZC}}$$

must be constant. This means that, since $t$ and Z are the only variables, they must vary in a direct ratio in order that the exponent $$\frac{t}{ZC}$$

may remain constant. Consequently we may write the expression $$Z = K_1 t \qquad (3)$$

where $K_1$ is a constant whose value depends on the values of $E_t$, E and C. Expression (3) shows a straight line relationship between the insulation resistance and the elapsed time before the gas-filled tube breaks down.

If $E_B$ represents the magnitude of the biasing potential and $E_G$ the magnitude of the breakdown potential of the tube G, then $$E_B + E_t = E_G \qquad (4)$$

Equation (4) indicates that the biasing potential of battery $B_1$ and the potential discharged by the line L together produce the potential impressed upon the electrodes of the tube G. If this impressed potential is greater than the breakdown potential of the tube, a substantial current will be discharged therethrough and relay R will operate. If, however, this impressed potential is less than the breakdown potential of the tube, practically no current will flow through the tube and the relay R will remain unoperated.

The arrangement shown in Fig. 2 may be employed to determine instantly whether the insulation resistance of a line, such as L, is above or below some predetermined value. Here an auxiliary charging circuit is included in the arrangement. This includes a battery $B_3$ connected in series with a resistance $Z_3$, the series circuit being connected in shunt with parallel elements of resistance $Z_4$ and capacity $C_2$ upon the closure of contact 11 by the key K. In this arrangement the battery $B_2$ is reversed in polarity with respect to the battery $B_1$. The purpose of the resistance $Z_4$ is to discharge the condenser $C_2$ when the key K is restored to place the circuit in readiness for the next test.

When the key K closes contact 10, the upper side of line L becomes positive in polarity and the lower side negative. When the key K later closes contact 11, the battery $B_3$ will transmit current through the resistance $Z_3$ to the parallel circuit of condenser $C_2$ and resistance $Z_4$. If the line L has no leakage, the effect of battery $B_2$ will be neutralized by the equal voltage to which the line L has previously become charged. However, batteries $B_1$ and $B_3$, being poled so as to be in series aiding, will produce a combined effect sufficient to break the gap between the electrodes of the tube G and therefore, the relay R will operate. A gong or other device controlled by the armature of the relay R may then be sounded.

If the line L has considerable leakage, it will discharge through its insulation resistance $Z_2$ and the magnitude of the current will depend upon the size of the leakage of the line. Under these conditions the difference between the line voltage and the battery voltage $B_2$ will oppose the combined effects of batteries $B_1$ and $B_3$. This difference will be proportional to the amount of the leakage in the line L and if the leakage is sufficiently great the opposing effect of battery $B_2$ will substantially reduce the voltage impressed upon the electrodes of the tube G, and, therefore, the gap between these electrodes will not be broken down. Hence, the relay R will not be operated. Thus, for very low leakage resistances, i. e., leakage resistances below the predetermined value, the gap provided by the electrodes of tube G will not be broken down and the relay R will remain unoperated. If the leakage resistances are above the predetermined value the gap provided by tube G will be broken down and relay R will be promptly operated.

As stated hereinabove the telephone line becomes charged to the voltage of battery $B_2$ when the contact 10 is closed, and soon thereafter, i. e., when contact 11 becomes closed, the voltage of the battery $B_3$ will charge the condenser $C_2$ through the resistance $Z_3$ at the same time that the telephone line discharges its impressed voltage. It is desirable, although unnecessary, that the time interval between the opening of contact 10 and the closure of contact 11 be reduced as much as possible. Moreover, the time interval between the consecutive opening and closing of contacts 10 and 11, respectively, should be substantially constant. If this time interval is fixed, it merely causes the voltage impressed across the two electrodes of the gas-filled tube G to be reduced by a predetermined amount as compared with the voltage which would reach the electrodes of tube G if the time interval were zero.

At the critical point $$E_G = E_B + E_t' - E_t \quad (5)$$

where $E_G$ = the breakdown potential of the gas-filled tube G $E_B$ = the biasing potential $E_t'$ = the potential across the condenser $C_2$ at time $t$ $E_t$ = the magnitude of the voltage discharged by the line L at time $t$.

This invention can also be used as a device for measuring capacitance, resistance, time or voltage by assigning suitable values to the terms of Equations (1) and (2).

The capacitance of a telephone line can be measured with this invention if the values $E_t$, $E$ and $Z$ of Equation (2) are known. Since $t$ and $C$ are then the only variables in the equation, they must vary in a direct ratio in order to maintain a balanced equation. Thus $$C = K_2 t \quad (6)$$

where $K_2$ is a constant whose value depends on the values of $E_t$, $E$ and $Z$. Expression (6) shows a straight line relationship between the capacitance and the elapsed time before the gas-filled tube breaks down. The mechanical operation of the measuring device is the same as that described for measuring insulation resistance.

Time can also be measured with this invention. By assigning suitable values to $E_t$, $E$, $Z$ and $C$ of Equation (2) and starting the device by operating the key K from contact 10 to contact 11 definite periods of time can be determined. Thus, referring to Equation (3), we get the following expression by division:

$$t = \frac{Z}{K_1} \quad (7)$$

The following expression is obtained from Equation (6) by division:

$$t = \frac{C}{K_2} \quad (8)$$

The period of time in question will be the interval between the closing of contact 11 and the breakdown of the gas-filled tube.

Potentials such as those across condensers, which cannot be measured by the ordinary voltmeter method without affecting the potentials being measured, can be determined with this invention due to the high impedance of the gas-filled tube. With reference to Fig. 4, in order to determine the voltage across the condenser $C_3$ it must be connected in the circuit in series with the gas-filled tube G, relay R and the parallel combination of the biasing battery $B_1$, the potentiometer $Z_1$ and the voltmeter V. The biasing battery $B_1$ and the condenser $C_3$ should be so poled as to be series aiding. The breakdown potential of the tube G must be known. The potentiometer $Z_1$ is adjusted manually so as to gradually increase the effective voltage of the battery $B_1$. When the sum of the voltages across the condenser $C_3$ and that indicated by the voltmeter V reaches the breakdown potential of the tube G, the gap of the tube will be broken down and the relay R will operate as described above. The voltage indicated by the voltmeter V should be noted at the instant the tube breaks down. Then $$E_C = E_G - E_V \quad (9)$$

where $E_C$ is the voltage across the condenser $C_3$, $E_G$ the breakdown potential of the tube G, and $E_V$ is the voltage indicated by the voltmeter V.

The charge or discharge time-voltage characteristic of a condenser shunted by a resistance can be determined from a curve plotted from values obtained with this invention. Let Fig. 3 represent this condenser and resistance, which may, of course, be a telephone line, and connect them to the line terminals L of Fig. 1. Connect a voltmeter across the biasing battery $B_1$. When the key K closes contact 10 the charging battery $B_2$ will be connected in series with the parallel elements $C_1$ and $Z_2$. Subsequently, when contact 11 is closed the condenser $C_1$ will discharge through its associated resistance $Z_2$ and the gas filled tube G will break down and cause the relay R to operate as hereinbefore described. The elapsed time between the closing of contact 11 and the breakdown of the tube G and voltage indicated by the voltmeter across battery $B_1$ at the instant of breakdown should be noted. The voltage across the condenser $C_1$ at time $t$ will then be obtained from Equation (9).

The values $E_c$ and $t$ will represent one point on the time-voltage curve. Other points are obtained by changing the biasing potential slightly by moving the switch arm $S_1$ across the potentiometer $Z_1$ and repeating the measurements as described above.

Resistance can be measured with this invention in much the same manner as insulation resistance is measured. It is merely necessary to connect a condenser of known capacitance in parallel with the resistance whose value is desired. The procedure from this point on is identical with that described above for determining the insulation resistance of a line or circuit.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. Testing apparatus for a telephone line comprising, in combination with the line, a source of potential, means for connecting said source of potential in series with said line so as to charge said line to the potential of said source, a gas-filled tube having a predetermined breakdown potential, and means for subsequently connecting said line in series with said source of potential and said tube.

2. The combination of a line, a source of potential, means for connecting said source of potential in series with said line so as to charge said line to the potential of said source, a gas-filled tube having a predetermined breakdown potential, means for subsequently connecting said line in series with said source of potential and said tube, indicating means, and means coupling the tube to the indicating means to operate the indicating means when the tube breaks down.

3. The method of testing the insulation resistance of a line with a gas-filled tube to determine whether the insulation resistance is above or below a predetermined value, which consists in charging the line to a definite voltage and impressing a biasing voltage on the electrodes of the gas-filled tube in such a manner that the residual voltage of the line plus the biasing voltage will cause the tube to break down when the insulation resistance of the line is smaller than the predetermined value.

4. The method of determining the insulation resistance of a line with a gas-filled tube, which consists in charging the line to a definite voltage, impressing a biasing voltage on the electrodes of the gas-filled tube, and determining the time required for the gap of the tube to break down.

5. The method of testing the insulation resistance of a line with a source of potential and a device which has a high impedance only while the potential across its terminals does not exceed a predetermined value, which consists in impressing the potential of said source on said line, impressing the potential of said line upon said device through said source of potential, and determining when the resultant voltage across the terminals of said device reaches the above mentioned predetermined value.

6. Apparatus for testing the insulation or leakage property of a line comprising the combination of a gas-filled tube having a known breakdown potential, a relay, a biasing battery having a terminal potential less than the break-down potential of said tube, a charging battery, and a switch having two fixed contacts, the closure of one of which connects the charging battery across the line, and the closure of the other of which connects the two batteries in series with each other and with the winding of the relay, as well as with the tube and the line being tested.

7. Apparatus for testing the insulation or leakage property of a line, comprising the combination of a gas-filled tube having a known break-down potential, a relay, a biasing battery having a terminal potential which is less than the break-down potential of said tube, a charging battery, a switch having two fixed contacts and a movable contact which may close either of the fixed contacts, the closure of one of the fixed contacts by the movable contact of the switch connecting the charging battery across the line, and the closure of the other fixed contact by the movable contact connecting the two batteries in series with each other so that their potentials are additive, the latter series circuit including the winding of the relay, the tube and the line being tested, and indicating means controlled by the armature of the relay.

8. The combination of a gas-filled tube and a source of light of predetermined luminosity external to said tube to continuously maintain the breakdown voltage of said tube substantially constant.

9. The combination of a gas-filled tube having two spaced electrodes which have a high impedance there-between and which exhibit a low impedance when the potential there-across exceeds a predetermined value, a source of light external to said tube, the rays of which continuously strike its envelope, and a sealed container housing said tube and said source of light.

10. The method of determining the insulation resistance of a line with a tube having electrodes between which a gap exists which consists in charging the line to a predetermined potential, discharging the line through its insulation resistance and through the gap existing between the electrodes of said tube, and determining the magnitude of the insulation resistance of the line from the time required for the potential across the line to be reduced to a lower predetermined value determined by the break-down potential of said tube, the lapsed time being directly proportional to the insulation resistance.

11. The method of determining the capacitance of a line with a gas-filled tube which consists in charging the line to a definite voltage, impressing the voltage of the line after charge, the charging voltage and a biasing voltage all in series with each other upon the electrodes of the tube, and determining the time required for the gap of the gas-filled tube to break down.

12. The method of determining time with apparatus including a gas-filled tube, a condenser of known capacitance, a resistance of known value in shunt with the condenser, which consists in charging the condenser and resistance to a predetermined voltage, impressing a biasing voltage on the gas-filled tube, and impressing the voltage of the charged condenser and resistance, the charging potential and the biasing potential all in series with each other upon the gas-filled tube.

13. Apparatus for determining the magnitude of the potential across a device such as an electrical condenser, comprising a circuit including a gas-filled tube, a source of biasing potential, and a source of charging potential, all of which are connected in series relationship, and means for determining the time required for the gas-filled tube to break down after the closure of the series circuit.

14. The method of measuring the capacitance of a condenser with a gas-filled tube, the impedance of which becomes greatly reduced upon the application of a voltage which equals or exceeds a predetermined value which consists in charging the condenser to a known voltage, discharging the condenser through a resistance of predetermined magnitude, and determining the time required after the beginning of discharge for the voltage across the tube to equal the predetermined value.

15. Voltage measuring apparatus comprising a gas-filled tube, a battery, a potentiometer, means for connecting said battery and said potentiometer in parallel with each other and in series with said tube, and means for precisely determining the time required for the gas-filled tube to break down after said connection is established.

16. Apparatus for measuring time comprising a gas-filled tube having a breakdown voltage of predetermined value, a condenser of predetermined capacitance, a resistance of predetermined magnitude connected in parallel with said condenser, means for charging the condenser to a predetermined voltage, and means for connecting said parallel resistance and condenser elements in series with said tube.

17. Apparatus for rapidly determining whether the insulation resistance of a line is above or below a predetermined value, comprising a gas-filled tube, a charging battery, a key having first and second contacts, the line being charged by said charging battery upon the closure of the first contact of said key, a biasing battery, a secondary charging battery, and a condenser, the line being connected in series with all of said batteries and said tube, and the condenser being connected across the secondary charging battery upon the closure of the second contact of said key.

18. The combination of a gas-filled tube having two electrodes, a poorly lighted room or container within which said tube is located, the break-down voltage between the electrodes of said tube being highly variable, and a source of light exposed to said tube so as to render the break-down voltage characteristic of said tube highly constant.

19. The method of maintaining the breakdown characteristic of a gas-filled tube substantially constant when it is located in a poorly lighted room or container which consists in continuously impressing light rays of predetermined luminosity upon the electrodes of said tube.

20. The method of maintaining the breakdown voltage of a gas-filled tube constant when that tube is placed in a room the luminosity within which is highly variable and which is sometimes totally dark which consists in producing and continuously transmitting highly luminous rays to the electrodes of the gas-filled tube.

PAUL G. EDWARDS.
CHARLES E. CLUTTS.